United States Patent Office 3,288,887
Patented Nov. 29, 1966

3,288,887
METHOD FOR MANUFACTURE OF ACRYLONI-TRILE-BUTADIENE-AROMATIC VINYL RESIN-OUS COMPOSITIONS
Masaaki Yoshino and Hisashi Morikawa, Kobe, Japan, assignors to Kanegafuchi Chemical Industry Company, Limited, Osaka, Japan, a corporation of Japan
No Drawing. Filed Jan. 2, 1963, Ser. No. 248,895
Claims priority, application Japan, Mar. 13, 1962, 37/10,058
5 Claims. (Cl. 260—880)

This invention relates to improvements in the method of manufacturing acrylonitrile-butadiene-aromatic vinyl resinous compositions.

Acrylonitrile-butadiene-aromatic vinyl resinous compositions, hereinafter sometimes referred to as ABAV, have found wide industrial acceptance due to their relatively low price and the fact that they possess physical and chemical properties which are superior to many other synthetic resins. For instance, ABAV has been found to have excellent impact resistance and may be easily worked.

Various processes for the manufacture of ABAV have been previously developed, such as by the copolymerization of acrylonitrile and styrene monomers in the presence of polybutadiene or styrene-butadiene latex. However, such processes have not been capable of producing ABAV of optimum quality. ABAV produced by these previously proposed processes have been unsatisfactory due to the formation of coagulated latex during the progress of the process; the considerable color development in the finished composition; the inferior impact resistance of the finished composition; and the fact that the finished composition does not have optimum hardness or working properties.

Admittedly various of the ABAV compositions which have been previously provided by the graft polymerization of aromatic vinyl and acrylonitrile monomers in synthetic latex containing butadiene polymer and/or styrene-butadiene copolymer are acceptable for certain uses and for use under certain conditions.

The primary object of our invention is the provision of a method of manufacturing acrylonitrile-butadiene-aromatic vinyl resinous compositions which may be readily worked, will be virtually colorless, unless a coloring agent is purposely added, and will possess optimum hardness and impact resistance.

Our method of manufacturing ABAV resinous compositions generally comprises the grafting of acrylonitrile and aromatic vinyl monomers to a styrene-butadiene latex in the presence of a polymerization catalyst system.

The styrene-butadiene synthetic latex used in our system preferably contains 17% to 24% by weight of combined styrene, is copolymerized so as to contain no gel, or if it contains a gel, such gel is one having high swelling capabilities; and is in a form having suspended particles with an average diameter of from approximately 0.1 to 1.0 micron a substantial quantity, of which particles, preferably at least 50% by weight, have a diameter larger than 0.5 micron.

If a styrene-butadiene latex is used in which the average particle diameter is below 0.1 micron, the finished composition will be transparent, but will have minimal impact resistance. On the other hand, if the average particle diameter exceeds 1.0 micron, the luster of the composition is markedly inferior. The average particle diameter of the styrene-butadiene latex is therefore important inasmuch as each of the above noted extremes are undesirable.

Aromatic vinyls which we have found to be particularly suitable for use in our method are styrene, alpha-methyl styrene, and vinyl toluene.

The catalyst system preferably includes an initiator, an activator, and an auxiliary agent.

The initiator is preferably an organic hydroperoxide. Of the class of organic hydroperoxides, we have tested and found to be satisfactory cumene hydroperoxide, para-menthane hydroperoxide, diisopropyl benzene hydroperoxide, and tert-butyl hydroperoxide.

The activator is preferably any one of or a mixture of sodium formaldehyde sulfoxylate, ascorbic acid, or dihydroxyacetone.

The auxiliary agent is preferably an iron chelate complex of an ethylenediaminetetraacetic acid salt, such as ethylenediaminetetraacetic 2 sodium salt.

In carrying out our process, traces of various other elements may be added in a manner which is well known in the art. As will be subsequently set forth in the various examples given, a trace of reagent, such as ferrous sulfate; mercaptans, preferably mixed tertiary mercaptans, such as a mercaptan mixture of about 10 to 14 carbon numbers, or diisopropyl xanthogen disulfide as a regulator; and a trace reagent of caustic potash (potassium hydroxide) may be used in our process, in a manner which will be subsequently described.

In practicing our process it was discovered that it was desirable to radically depart from the practices of previous processes of graft polymerization. For instance, it was found that potassium persulfate, which is ordinarily used in graft polymerization, was unsuitable. It was discovered that the initiator activity of potassium persulfate was so low that in order to polymerize the acrylonitrile and aromatic vinyl monomers in the presence of latex an extremely large quantity of potassium persulfate and a high temperature was required. For example, it was discovered that potassium persulfate above 0.7% by weight of the total quantity of monomers was required, as well as a temperature of above 70 degrees centigrade. The use of such a quantity of potassium persulfate, at such a high temperature, caused the latex to become unstable and to prematurely coagulate. Furthermore, when potassium persulfate was used, it was discovered that the finished composition would tend to color a dark brown when it was hot rolled at temperatures of 150 degrees centigrade.

It was further discovered that benzoyl peroxide and lauroyl, each of which are normally used in graft polymerization processes, were not suitable for use in our process. This was due to the fact that they are low in initiator activity, and caused a premature coagulation of the latex, even when a small quantity was used.

Another initiator normally used in graft polymerization processes, but which was found to be unsuitable in our process, even though it is high in activity, was sodium pyrophosphate-dextrose. This component was found to be unsuitable because the reddish brown color of basic dextrose was transmitted to the product, so that the product was colored to a marked degree during the molding process.

In the formulation of our method of manufacturing acrylonitrile-butadiene-aromatic vinyl resinous compositions that were free from coloration and had a high impace strength, we found it necessary to solve many problems. Some of the problems encountered were:

(1) We found that the mechanical stability of latex rapidly deteriorates when a water soluble monomer such as acrylonitrile is added. This causes the resin to precipitate during polymerization, forming a partially coagulated emulsion, and that it is impossible to polymerize such emulsion.

(2) We discovered that if the total quantity of catalytic monomers was simultaneously added to the latex, as is conventional, followed by polymerization, that the resultant resin was of low impact strength. This phenomenon frequently occurred when a large amount of modifier was used in order to maintain the necessary flow during the processing of the composition.

(3) We further discovered that if we simultaneously added the total quantity of the catalytic monomer to the latex, a very dark discoloration took place.

(4) The usual commercially available latex contains a polymerization inhibitor or anti-oxidant so that it may be conveniently worked by a manufacturer. Inasmuch as these additives obstruct the progress of polymerization, a strong initiator is required in order to overcome such inhibitors and carry on graft polymerization. The necessary initiator activity is usually obtained by (a) the use of a large quantity of initiator, (b) the application of a high temperature, or (c) use of an oxidation-reduction type initiator. We discovered that the attainment of a strong initiator activity by these methods, in the conventional manner, resulted in a coloration of both the polymeric product and the moldings obtained therefrom.

(5) We further discovered that certain types of initiators would impair the mechanical stability of the latex during polymerization, making a satisfactory polymerization operation impossible.

(6) We discovered that it was necessary to limit the quantity and time of addition of an emulsifier. Although it is desirable to add such an emulsifier to improve the stability of the latex, a large quantity cannot be added as it will lower the graft efficiency.

Our method overcomes each of the foregoing problems, primarily by controlling the type and quantity of the catalyst system, comprising the initiator, activator and auxiliary agent, and by regulating the addition of acrylonitrile and aromatic vinyl monomers.

In the practice of our method, the basic charging ratio of raw materials is, by weight, 17% to 33% acrylonitrile component, 18% to 36% latex (butadiene component) and 31% to 65% aromatic vinyl component. Inasmuch as the graft polymerization conversion of our method is high, the composition of the finished product will be approximately equal to the ratio of the charged raw materials.

The latex content is important, for when the same is below approximately 18%, the impact resistance of the product obtained is low, and if the latex content exceeds approximately 36%, the material will not flow sufficiently during the molding process.

A quantity of 17% to 33% of acrylonitrile is desirable in order to provide proper processability, miscibility and chemical resistance. The hardness of the product also increases as the quantity of acrylonitrile increases.

A given charge for our graft polymerization process preferably includes, in addition to the acrylonitrile component, latex component (butadiene) aromatic vinyl component, the following:

An initiator, preferably an organic hydroperoxide, diisopropyl benzene hydroperoxide, or tert-buty hydroperoxide in a quantity preferably below 0.5% by weight. The optimum quantity is 0.1% to 0.3% by weight.

As the activator we preferably use any one of or a mixture of 0.1% to 1.0% by weight of sodium formaldehyde sulfoxylate, 0.2% to 0.6% by weight being preferable; 0.05% to 0.5% by weight ascorbic acid, 0.07% to 0.2% by weight being preferable; and 0.03% to 0.3% by weight dihydroxyacetone, 0.05% to 0.1% by weight being preferable.

We use 0.002% to 0.08% by weight of an auxiliary agent, 0.002% to 0.05% by weight being preferable. Such auxiliary agent preferably includes 0.002% to 0.05% by weight of the sodium salt of ethylenediaminetetraacetate and from 0.003% to 0.03% by weight iron salt. We preferably use ferrousسسulfate as the iron salt, as previously specified, although other iron salts such as ferrous chloride may be used. When ferrous sulfate is used as the iron salt, we preferably use from 0.005% to 0.01% by weight of the sodium salt of ethylenediaminetetraacetate.

A catalyst system made up as above described will have very strong initiating properties at a temperature between 40 degrees to 65 degrees centigrade; the tendency of coloration is small; and there is no interference with the stability of the latex.

In the use of a regulator such as mercaptan, the quantity used is considered to be critical. If a quantity of regulator below 0.5% by weight is used, the resultant composition is of poor quality for use in injection molding, and if a quantity above 2.0% by weight is used, the impact resistance will be impaired. We therefore use from 0.5% to 2.0% by weight regulator, 0.9% to 1.4% by weight providing optimum results. The use of a large quantity of a mercaptan is undesirable due to its odor.

We have discovered that step-by-step addition of the acrylonitrile and aromatic vinyl momomers, as will be subsequently described, permits a reduction in the quantity of mercaptan mixture required for obtaining the desirable degree of polymerization, as compared with the quantity of mercaptan mixture required for obtaining the desirable degree of polymerization in conventional methods of total charging of such monomers with the latex. An excellent regulating effect and relatively little odor may be obtained by substitution of diisopropyl xanthogen disulfide for a mercaptan mixture.

In carrying out the process of graft polymerization according to our invention, the total amount of latex is first charged into a kettle, together with less than 20% by weight of the total amount of acrylonitrile and aromatic vinyl monomers and initiator. The balance, more than 80% of the acrylonitrile and aromatic vinyl monomers and initiator being added continuously or a portion at a time. The activator and auxiliary agent may be intermixed with the original charge, added continuously, or in step-by-step portions during polymerization. The concentration of the catalyst system does not necessarily have to be maintained constant during polymerization, fluctuation of concentration being permitted to some extent. Needless to say, various regulators, emulsifiers and modifiers may be added, as is well known in the art.

The continuous or step-by-step addition of the acrylonitrile and aromatic vinyl monomers, particularly the acrylonitrile monomer is necessary in order to secure stability of the latex during polymerization. As previously set forth, latex becomes unstable when a large quantity of a water soluble monomer such as acrylonitrile is present, so that if the acrylonitrile monomer is added to the latex all at once there is likely to be formed a lumpy polymer. It is generally desirable to carry out the supplementary addition over a period of three to twelve hours. Charge additions should be made at least five times during this period, preferably as many as five to ten. It is likewise desirable to improve the conversion by "post-polymerizing" for one or two hours after all additions have been completed.

A temperature below 70 degrees is preferably used in the system. Particularly good quality and efficiency are obtained with temperatures of between 45 degrees to 60 degrees centigrade. When the temperature exceeds 70 degrees centigrade, the yield of polymerization will be increased and the time will become shorter, but colored and non-uniform resin is formed. If the temperature is too low, the yield will become poorer and the time required for polymerization will be increased, both of which are uneconomical. The temperature ratio herein specified is thus determined by taking into consideration the quality of the final composition desired, optimum polymerization conditions, and the economics of the process. Examples of our method are as follows:

*Example I*

There is initially provided a polymerization reactor having a jacket heating device, stirrer, condensor, and nitrogen gas inlet, as is well understood in the art, together with suitable means for making supplementary additions.

of the acrylonitrile and aromatic vinyl monomers, together with the various other components. Polymerization is, of course, carried out in a nitrogen stream, as is conventional.

The polymerization reactor is charged as follows:

100 parts of water; 60 parts of styrene-butadiene latex, a copolymer rubber having constituent properties as above described, i.e., approximately 24.1% by weight bound styrene, having little or no gel, and which contains particles of average diameter of 0.3 micron and a large quantity of particles having a diameter over 1 micron, diluted with water to a resin content of 50% by weight; 2.7 parts acrylonitrile; 4.3 parts styrene; 0.06 part diisopropyl benzene hydroperoxide (preferably a 50% solution); 0.07 part mixed tertiary mercaptans; and 0.03 part potassium hydroxide.

This mixture is stirred for 30 minutes at 60 degrees centigrade.

There was then added 0.2 part sodium formaldehyde sulfoxylate; 0.005 part ethylenediaminetetraacetate 2 sodium salt; 0.001 part ferrous sulfate, and 20 parts water.

Initiation of polymerization was confirmed by heat evolution.

24.3 parts acrylonitrile; 38.7 parts styrene; 0.25 part diisopropyl benzene hydroperoxide; and 0.63 part mixed tertiary mercaptans were added at a uniform rate over a period of 6 hours.

Post polymerization was then carried on for 1 hour, after which it was determined that the conversion was 95%. (Such conversion was calculated by vaporizing and drying the latex in the presence of hydroquinone and obtaining the solid content.)

The polymer was then treated to coagulate with sodium chloride and hydrochloric acid, heated to 85 degrees centigrade, filtered, dehydrated, and then dried at 75 degrees centigrade.

The dried resin was then kneaded with differential speed rollers, heated to 150 degrees centigrade, and then formed into a sheet.

In order to secure a comparative analysis of the composition produced by Example I a series of reference examples were prepared, as follows:

Reference Example a—The same recipe was used as given in Example I, but a total of 1.4 parts of mixed tertiary mercaptans was used.

Reference Example b—The same components were utilized as given in Example I, but the entire quantity of acrylonitrile and aromatic vinyl monomers, together with the total quantity of catalyst products were charged together in the reactor at the outset.

Reference Example c—The charge was prepared as given in reference Example b, but 1.4 parts of mixed tertiary mercaptans were used.

Reference Example d—Latex with an average particle size of 0.05 micron was used under the same conditions as specified in Example I.

Comparative results of these various examples was as follows:

TABLE I

| | Example I | Reference Examples | | | |
|---|---|---|---|---|---|
| | | a | b | c | d |
| Color | Light cream, translucent. | Light cream, translucent. | Yellow Opaque | Light Yellow Opaque. | Light cream transparent. |
| Shrinkage* (Percent) | 5 | 8 | 20 | 22 | 10. |
| Tensile Strength (kg./cm.²) | 300 | 230 | 250 | 220 | 230. |
| Izod Impact Strength (ASTM-256-47T) ¼″, with notch (kg. cm./cm.²). | 60 | 20 | 25 | 3 | 10. |
| Rockwell Hardness (R) | 91 | 88 | 89 | 88 | 90. |

*Shrinkage indicates the percentage of shrinkage which took place when the sheet was cooled after removal from the rolls at 150 degrees centigrade.

In addition to the analysis set forth in the above table, the sheets of Examples b and c produced, upon cooling, sheets having a wavy surface, whereas the sheets produced according to Example I had a smooth surface.

*Example II*

The following raw materials were charged into the same apparatus as in the case of Example I.

(a)

| | Parts |
|---|---|
| Water (including moisture in the latex | 160 |
| Latex having an average particle size of 0.1 micron and a quantity of particles over 0.5 micron, the latex containing 23.3% coupled styrene, and having a small quantity of gel with a high degree of expansibility | 25 |
| Potassium hydroxide | 0.03 |

(b)

| | |
|---|---|
| Acrylonitrile | 2.7 |
| Styrene | 4.8 |
| Mixed tertiary mercaptans | 0.08 |
| Diisopropyl benzene hydroperoxide (50% solution) | 0.1 |

(c)

| | |
|---|---|
| Ethylenediaminetetraacetate 2 sodium sale | 0.01 |
| Ferrous sulfate | 0.003 |
| Ascorbic acid | 0.08 |
| Potassium hydroxide | 0.03 |
| Water | 20 |

(d)

| | |
|---|---|
| Acrylonitrile | 24.3 |
| Styrene | 43.2 |
| Mixed tertiary mercaptans | 0.72 |
| Diisopropyl benzene hydroperoxide | 0.2 |

(a) and (b) were mixed, were stirred for 30 minutes at 60 degrees centigrade, and 20% of (c) was added. After polymerization had been initiated, the balance of (c) and (d) were added drop by drop over a period of 6 hours. Polymerization was then carried on for another hour. The latex was then coagulated with a 5% formic acid solution, the resin was washed with water, dehydrated and dried 94 parts of resin were obtained.

A reference example was then made in order to provide a comparative analysis, as follows:

Reference Example e—The resin was prepared in the same manner as set forth in Example II, but 1.0 part of sodium prophosphate-dextrose was used in place of ascorbic acid.

Example III

The following raw materials were charged into the same apparatus as in the case of Example I:

(a)

| | Parts |
|---|---|
| Water | 140 |
| The same latex as in Example II, but diluted to 50% resin content | 40 |
| Acrylonitrile | 6.2 |
| Styrene | 9.8 |
| Mixed tertiary mercaptans | 0.2 |

(b)

| | |
|---|---|
| Acrylonitrile | 6.2 |
| Styrene | 9.8 |
| Mixed tertiary mercaptans | 0.2 |

(c)

| | |
|---|---|
| Diisopropyl benzene hydroperoxide (50% solution) | 0.04 |
| Benzene | 0.1 |

(d)

| | |
|---|---|
| Sodium formaldehyde sulfoxylate | 0.4 |
| Ethylenediaminetetraacetate 2 sodium salt | 0.01 |
| Ferrous sulfate | 0.0025 |
| Water | 20 |

(a) was stirred for 30 minutes at 60 degrees centigrade. (c) was added to this mixture and then 20% of (d) was added drop by drop after 10 minutes. Polymerization took place instantaneously and the inside temperature rose by 5 degrees centigrade. After the evolution of heat had ceased (taking about 20 minutes) the reaction mixture was further mixed for 10 minutes, (b) was added and mixed for 10 minutes. Mixture (c) was added again and 20% of (d) added drop by drop.

Heat evolution was rather violent and the inside temperature rose 8 degrees centigrade. Ten minutes after the heat evolution had been completed, the same operation as above noted was repeated three times.

About 4 hours was required for polymerization. The latex obtained was treated in the same manner as Example I to obtain the resin.

The comparative analysis as between Examples II and III and reference Example e is shown in Table 2.

TABLE 2

| | Example I | Example II | Reference Example (e) |
|---|---|---|---|
| Color | Light Cream | White | Yellowish Brown. |
| Shrinkage (Percent) | 5 | 15 | 15. |
| Tensile Strength (kg./cm.²) | 360 | 450 | 350. |
| Izod Impact Strength ¼", with notch (kg. cm./cm.²). | 48 | 31 | 43. |
| Rockwell Hardness (R) | 100 | 109 | 99. |

Example IV

The following raw materials were charged into the same apparatus as in the case of Example I:

140 parts water (including the water contained in the rubber latex), 23 parts latex, 0.03 part potassium hydroxide, 5.4 parts acrylonitrile, 9.0 parts styrene, 0.16 part diisopropyl xanthogen disulfide, and 0.12 part diisopropyl benzene hydroperoxide.

The mixture was stirred for 30 minutes in a nitrogen stream at 60 degrees centigrade. Polymerization was initiated when 20% of a mixture of activator and polymerization assistant composed of 0.07 part dihydroxyacetone, 0.02 part ethylenediaminetetraacetate 2 sodium salt, 0.002 part ferrous sulfate and 20 parts water were added. Over a period of 6 hours a supplementary addition of the balance of the aforementioned mixture of activator and polymerization assistant together with a mixture composed of 21.6 parts acrylonitrile, 36 parts styrene, 0.25 part diisopropyl benzene hydroperoxide and 0.64 part diisopropyl xanthogen disulfide was made continuously.

After the supplementary additions had been completed, polymerization was carried on further for 1 hour and the resin obtained in the same manner as in Example I. 94 parts of the resin were obtained.

Applicants have analyzed the resin obtained by their method in order to determine the nature of graft polymerization which it provides. This was done by dissolving the resin in a mixed solvent of methylethyl ketone, which is a good solvent for the acrylonitrile-styrene component and benzene which is a good solvent for synthetic rubber, a turbid solution similar to aqueous latex being obtained.

Microscopic examination of this turbid solution confirmed the existence of dispersed particles of graft polymer with synthetic rubber particles as the core. This therefore leads applicants to believe that their method provides a cross linkage formed between synthetic rubber molecules by graft polymerization.

It was furthermore discovered that when polymerization was carried out without adding the acrylonitrile and the aromatic vinyl monomers continuously, or in portions as set forth above, the polymer obtained was of low impact strength; would not dissolve in the solvent mentioned above, but became a solution of high transparency with only slight turbidity; and, when such solution was observed through a microscope, the presence of rubber particles was not very clear.

It is obvious that our invention is not limited to the specific examples herein enumerated.

Various changes may be made in the form of invention herein described without departing from the spirit of the invention or the scope of the following claims.

We claim:

1. A method for manufacturing an acrylonitrile-butadiene-aromatic vinyl monomer composition having, by weight, 17% to 33% acrylonitrile, 18% to 36% butadiene and 31% to 65% aromatic vinyl component, which comprises graft-polymerizing acrylonitrile and aromatic vinyl monomers onto a selected styrene-butadiene latex in the presence of a selected polymerization catalyst system; the selected styrene-butadiene latex containing substantially 17% to 24% by weight combined styrene, having particles with an average diameter of from 0.1 to 1.0 micron, at least 50% by weight of such particles having a diameter larger than 0.5 micron, and being polymerized so as to contain relatively no gel, and any gel so contained is one having high swelling capabilities; the selected polymerization catalyst system includes an organic hydroperoxide as an initiator, a mixture of sodium formaldehyde sulfoxylate, ascorbic acid and dihydroxyacetone as an activator, and an iron chelate complex of an ethylenediaminetetraacetic acid salt as an auxiliary agent; and in which such graft-polymerization includes the steps of initially charging the polymerization reactor with a mixture containing the total amount of styrene-butadiene latex to be used, less than 20% by weight of the total acrylonitrile and aromatic vinyl monomers to be used and less than 20% by weight of the initiator to be used, and adding the residual amounts of acrylonitrile and aromatic vinyl monomers and the initiator as polymerization progresses.

2. The method as specified in claim 1 wherein the residual amounts of the acrylonitrile and aromatic vinyl monomers and the initiator are added to the polymerization reactor in step-by-step portions as polymerization progresses.

3. The method as specified in claim 1 wherein the residual amounts of the acrylonitrile and aromatic vinyl monomers and the initiator are continuously added to the polymerization reactor as polymerization progresses.

4. The method as specified in claim 1 wherein the amount of organic hydroperoxide added is less than 0.5% by weight of the total monomers.

5. A method for manufacturing an acrylonitrile butadiene-aromatic vinyl monomer composition having, by weight, 17% to 33% acrylonitrile, 18% to 36% butadiene and 31% to 65% aromatic vinyl component, which comprises graft-polymerizing acrylontrile and aromatic vinyl monomers onto a selected styrene-butadiene latex in the presence of a selected polymerization catalyst system; the selected styrene-butadiene latex containing substantially 17% to 24% by weight combined styrene, having particles with an average diameter of 0.1 to 1.0 micron, many of such particles having a diameter larger than 0.5 micron, and being polymerized so as to contain relatively no gel, and any gel so contained is one having high swelling capabilities; the selected polymerization catalyst system includes an organic hydroperoxide as an initiator, an activator selected from the group consisting of sodium formaldehyde sulfoxylate, ascorbic acid, dihydroxyacetone and a mixture of sodium formaldehyde sulfoxylate, ascorbic acid and dihydroxyacetone, and an iron chelate complex of an ethylenediaminetetraacetic acid salt as an auxiliary agent; and in which such graft polymerization includes the steps of charging the polymerization reactor with a mixture containing the total amount of the styrene-butadiene latex to be used, less than 20% by weight of the total acrylonitrile and aromatic vinyl monomers to be used and less than 20% by weight of the initiator to be used, and adding the the residual amounts of acrylonitrile and aromatic vinyl monomers and the initiator as polymerization progresses.

References Cited by the Examiner

UNITED STATES PATENTS

| | | | |
|---|---|---|---|
| 2,802,808 | 8/1957 | Hayes | 260—880 |
| 3,073,798 | 1/1963 | Baer | 260—880 |
| 3,074,906 | 1/1963 | Calvert | 260—880 |

FOREIGN PATENTS 867,822  5/1961  Great Britain.

MURRAY TILLMAN, *Primary Examiner.*

P. LIEBERMAN, *Assistant Examiner.*